(12) United States Patent
Murphy et al.

(10) Patent No.: US 7,829,477 B2
(45) Date of Patent: Nov. 9, 2010

(54) FLUORINATED WATER SOLUBLE COPOLYMERS

(75) Inventors: Peter Michael Murphy, Chadds Ford, PA (US); Jessica Sinks, Newark, DE (US); Ying Wang, West Chester, PA (US)

(73) Assignee: E.I. duPont de Nemours and Company, Wilmington, DE (US)

( * ) Notice: Subject to any disclaimer, the term of this patent is extended or adjusted under 35 U.S.C. 154(b) by 652 days.

(21) Appl. No.: 11/978,290

(22) Filed: Oct. 29, 2007

(65) Prior Publication Data
US 2009/0111344 A1 Apr. 30, 2009

(51) Int. Cl.
B32B 5/02 (2006.01)
(52) U.S. Cl. .......................................... 442/93; 442/94
(58) Field of Classification Search .............. 442/93, 442/94
See application file for complete search history.

(56) References Cited

U.S. PATENT DOCUMENTS

| | | | |
|---|---|---|---|
| 2,803,615 A | 8/1957 | Ahlbrecht et al. | |
| 2,995,542 A | 8/1961 | Brown | |
| 3,282,905 A | 11/1966 | Fasick et al. | |
| 3,890,376 A | 6/1975 | Jäger | |
| 3,979,469 A | 9/1976 | Jäger | |
| 4,032,495 A | 6/1977 | Perronin et al. | |
| 4,940,757 A | 7/1990 | Moss, III et al. | |
| 5,481,028 A | 1/1996 | Petrov et al. | |
| 5,558,940 A | 9/1996 | Michels et al. | |
| 5,759,431 A | 6/1998 | Nguyen | |
| 6,130,298 A | 10/2000 | Yamana et al. | |
| 6,201,122 B1 | 3/2001 | Dams | |
| 6,518,380 B2 | 2/2003 | Juhue et al. | |
| 6,525,127 B1 | 2/2003 | Jariwala et al. | |
| 6,544,594 B2 | 4/2003 | Linford et al. | |
| 6,616,856 B1 | 9/2003 | Pacifici et al. | |
| 6,833,419 B2 | 12/2004 | Morschhäuser et al. | |
| 6,852,781 B2 | 2/2005 | Savu et al. | |
| 6,855,772 B2 | 2/2005 | Linford et al. | |
| 7,053,146 B2 | 5/2006 | Morschhäuser et al. | |
| 7,078,454 B2 | 7/2006 | Burleigh et al. | |
| 2003/0051639 A1 | 3/2003 | Dams et al. | |
| 2004/0018338 A1 | 1/2004 | Materniak et al. | |
| 2004/0138083 A1 | 7/2004 | Kimbrell, Jr. et al. | |
| 2005/0210600 A1 | 9/2005 | Collier et al. | |
| 2006/0062968 A1 | 3/2006 | Elgarhy | |

FOREIGN PATENT DOCUMENTS

| | | |
|---|---|---|
| DE | 2140261 | 8/1971 |
| DE | 4426536 | 7/1994 |
| EP | 0 930 351 B1 | 1/1998 |
| EP | 1 632 542 A1 | 3/2006 |
| JP | SHO 54(1979)-145388 | 11/1979 |
| JP | 2002105433 A | 4/2002 |
| JP | 2002259165 A | 9/2002 |
| JP | 2004250517 A | 9/2004 |
| WO | WO 01/19883 A1 | 3/2001 |
| WO | WO01/30873 A | 3/2001 |
| WO | WO 2005/092937 A1 | 10/2005 |

OTHER PUBLICATIONS

Balague et al., Synthesis of fluorinated telomers, Part 1, Telomerization of vinylidene fluoride with perfluoroalkyl iodides; Journal of Fluorine Chemistry (1995), 70(2), 215-223.
Zhang et al., Fluorocarbon-containing hydrophobically modified poly(N-isopropylacrylamide; Chinese Journal of Chemistry (1999), 17(3), 244-257; Shanghai, PRC. Abstract.
Naud et al., Synthesis of terminally perfluorinated long-chain alkanethiols, sulfides and disulfides from the corresponding halides; Journal of Fluorine Chemistry (2000), 104(2), 173-183.
Honda et al., Molecular Aggregation Structure and Surface Properties of Poly(fluoroalkyl acrylate) Thin Films; Macromolecules (2005), 38(13), 5699-5705.

*Primary Examiner*—Lynda Salvatore
(74) *Attorney, Agent, or Firm*—Nancy S. Mayer

(57) ABSTRACT

A method of providing water repellency, oil repellency, soil resistance, soil release, stain resistance and stain release to substrates comprising contacting said substrate with a composition comprising a copolymer having repeating units of Formula 1 in any sequence:

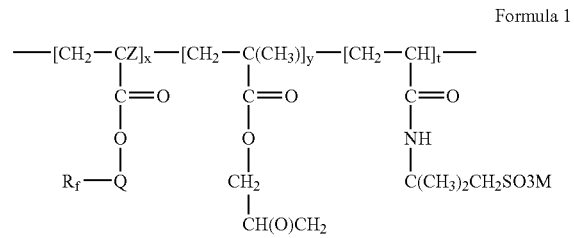

Formula 1 wherein
$R_f$ is a straight or branched perfluoroalkyl group having from about 2 to about 8 carbon atoms, or a mixture thereof, which is optionally interrupted by at least one oxygen atom,
Q is alkylene of 1 to about 15 carbon atoms, hydroxyalkylene of 2 to about 15 carbon atoms, $-O(C_nH_{2n})-$, $-(CH_2CF_2)_m(CH_2)_n-$, $-CONR^1(C_nH_{2n})-$, $-(C_nH_{2n})OCONR^1(C_nH_{2n})-$, $(-CONR^1CH_2)_2CH-$, $-SO_2N(R^1)(C_nH_{2n})-$, or $-(C_nH_{2n})SO_2N(R^1)(C_nH_{2n})-$,
each $R^1$ is independently H or alkyl of 1 to about 4 carbon atoms,
each n is independently 1 to about 15,
each m is independently 1 to about 4,
Z is hydrogen or methyl,
x is a positive integer,
y is zero or a positive integer,
t is a positive integer, and
M is $H^+$, alkali metal cation, alkaline earth metal cation, or ammonium.

18 Claims, No Drawings

FLUORINATED WATER SOLUBLE COPOLYMERS

FIELD OF THE INVENTION

The present invention relates to a method of treating substrates with fluorinated water soluble (meth)acrylate copolymers which impart water repellency, oil repellency, soil resistance, soil release, stain resistance and stain release to the treated substrates therewith.

BACKGROUND OF THE INVENTION

Various fluorinated polymer compositions are known to be useful as treating agents to provide surface effects to substrates. Surface effects include repellency, soil resistance, soil release, stain resistance and stain release, and other effects, which are particularly useful for fibrous substrates and other substrates such as hard surfaces. Many such treating agents are fluorinated polymers or copolymers.

Most commercially available fluorinated polymers useful as treating agents for imparting repellency to substrates contain predominantly more than eight carbons in the perfluoroalkyl chain to provide the desired properties. Honda et al, in Macromolecules (2005), 38(13), 5699-5705, teach that for perfluoroalkyl chains of greater than 8 carbons, orientation of the perfluoroalkyl chains is maintained in a parallel configuration while for such fluoroalkyl chains having fewer carbons, reorientation occurs. Thus short fluoroalkyl groups having 6 or less carbons have traditionally not been successful commercially for imparting surface effects to substrates because of the absence of highly ordered perfluoroalkyl chains at the outermost surfaces.

U.S. Pat. No. 6,833,419 discloses a water-soluble or water-swellable copolymer obtained by free-radical copolymerization of acryloyldimethyltaurine and/or acryloyldimethyltaurates with one or more fluorine-containing compounds. The resulting copolymers are useful as thickeners. However, no surface effects to substrates are disclosed in this patent.

There is a need for a method of treating substrates with water-soluble polymer compositions which impart surface effects including water repellency, oil repellency, soil resistance, soil release, stain resistance and stain release, and other effects, while using fluorinated monomers containing perfluoroalkyl groups of eight carbons or less. The present invention provides such a method.

SUMMARY OF THE INVENTION

The present invention comprises a method of providing water repellency, oil repellency, soil resistance, soil release, stain resistance and stain release to a substrate comprising contacting said substrate with a composition comprising a copolymer having repeating units of Formula 1 in any sequence:

$$\text{Formula 1}$$
$$—[CH_2—CZ]_x—[CH_2—C(CH_3)]_y—[CH_2—CH]_t—$$
$$\begin{array}{ccc} | & | & | \\ C=O & C=O & C=O \\ | & | & | \\ O & O & NH \\ | & | & | \\ R_f—Q & CH_2 & C(CH_3)_2CH_2SO_3M \\ & | & \\ & CH(O)CH_2 & \end{array}$$

wherein
$R_f$ is a straight or branched perfluoroalkyl group having from about 2 to about 8 carbon atoms, or a mixture thereof, which is optionally interrupted by at least one oxygen atom,
Q is alkylene of 1 to about 15 carbon atoms, hydroxyalkylene of 2 to about 15 carbon atoms, $—O(C_nH_{2n})—$, $—(CH_2CF_2)_m(CH_2)_n—$, $—CONR^1(C_nH_{2n})—$, $—(C_nH_{2n})OCONR^1(C_nH_{2n})—$, $(—CONR^1CH_2)_2CH—$, $—SO_2N(R^1)(C_nH_{2n})—$, or $—(C_nH_{2n})SO_2N(R^1)(C_nH_{2n})—$,
each $R^1$ is independently H or alkyl of 1 to about 4 carbon atoms,
each n is independently 1 to about 15,
each m is independently 1 to about 4,
Z is hydrogen or methyl,
x is a positive integer,
y is zero or a positive integer,
t is a positive integer, and
M is $H^+$, alkali metal cation, alkaline earth metal cation, or ammonium.

The present invention further comprises substrates treated with a composition of Formula I described above having water repellency, oil repellency, soil resistance, soil release, stain resistance and stain release properties.

DETAILED DESCRIPTION OF THE INVENTION

All trademarks are denoted herein by capitalization.

The term "(meth)acrylate", as used herein, indicates either acrylate or methacrylate.

The present invention comprises a method of treating substrates with a water-soluble copolymer comprising repeating units of Formula 1 in any sequence:

$$\text{Formula 1}$$
$$—[CH_2—CZ]_x—[CH_2—C(CH_3)]_y—[CH_2—CH]_t—$$
$$\begin{array}{ccc} | & | & | \\ C=O & C=O & C=O \\ | & | & | \\ O & O & NH \\ | & | & | \\ R_f—Q & CH_2 & C(CH_3)_2CH_2SO_3M \\ & | & \\ & CH(O)CH_2 & \end{array}$$

wherein
$R_f$ is a straight or branched perfluoroalkyl group having from about 2 to about 8 carbon atoms, or a mixture thereof, which is optionally interrupted by at least one oxygen atom,
Q is alkylene of 1 to about 15 carbon atoms, hydroxyalkylene of 2 to about 15 carbon atoms, $—O(C_nH_{2n})—$, $—(CH_2CF_2)_m(CH_2)_n—$, $—CONR^1(C_nH_{2n})—$, $—(C_nH_{2n})OCONR^1(C_nH_{2n})—$, $(—CONR^1CH_2)_2CH—$, $—SO_2N(R^1)(C_nH_{2n})—$, or $—(C_nH_{2n})SO_2N(R^1)(C_nH_{2n})—$,
each $R^1$ is independently H or alkyl of 1 to about 4 carbon atoms,
each n is independently 1 to about 15,
each m is independently 1 to about 4,
Z is hydrogen or methyl,
x is a positive integer,
y is zero or a positive integer,
t is a positive integer, and
M is $H^+$, alkali metal cation, alkaline earth metal cation, or ammonium.

The polymer sequence includes random, statistical, block, multiblock, gradient, or alternating repeating units, wherein, monomers can be head-to-head or tail-to-tail. Preferably the (meth)acrylate copolymers are in the head-to-tail configuration.

In Formula 1, x is preferably from 1 to about 10,000, more preferably from about 1 to 5000, more preferably about 5 to about 2000, or a mixture thereof; y is preferably from 0 to about 10,000, more preferably from about 1 to 5000, more preferably from about 5 to about 2000, or a mixture thereof; and t is preferably from 1 to about 10,000, more preferably from 1 to 5000, more preferably from about 5 to about 2000, or a mixture thereof.

$R_f$ is preferably a straight or branched perfluoroalkyl group having from about 2 to about 8 carbon atoms, more preferably from about 2 to about 6 carbon atoms, and more preferably from about 4 to about 6 carbon atoms, or a mixture thereof, optionally interrupted by at least one oxygen atom. Typically $R_f$ is optionally interrupted by one to five oxygen atoms. Examples of suitable $R_f$ include $C_6F_{13}$—, $C_4F_9$—, $C_3F_7$—, $C_4F_9CH_2CF_2$—, $C_3F_7OCF_2CF_2$—, $C_3F_7OCHFCF_2$—, $C_3F_7OCF(CF_3)$—, and $C_3F_7O$—$(CF(CF_3)CF_2O)_k$ CFCF$_3$)—, wherein k is 1 to 4.

Q is alkylene of 1 to about 15 carbon atoms, hydroxyalkylene of 2 to about 15 carbon atoms, —O($C_nH_{2n}$)—, —(CH$_2$CF$_2$)$_m$(CH$_2$)$_n$—, —CONR$^1$(C$_n$H$_{2n}$)—, —(C$_n$H$_{2n}$) OCONR$^1$(C$_n$H$_{2n}$)—, (—CONR$^1$CH$_2$)$_2$CH—, —SO$_2$N(R$^1$) (C$_n$H$_{2n}$)—, or —(C$_n$H$_{2n}$)SO$_2$N(R$^1$)(C$_n$H$_{2n}$)—, wherein R$^1$ is independently H or alkyl of 1 to about 4 carbon atoms, n is independently 1 to about 15, and m is 1 to about 4. Examples of preferred Q include —CH$_2$CH$_2$—, CH$_2$CH(OH)CH$_2$—, —O(C$_n$H$_{2n}$)—, —(CH$_2$CF$_2$)$_m$CH$_2$CH$_2$—, —CONHCH$_2$CH$_2$—, —CH$_2$CH$_2$O—CONHCH$_2$CH$_2$—, (—CONHCH$_2$)$_2$CH—, —SO$_2$N(CH$_3$)CH$_2$CH$_2$—, or —SO$_2$N(C$_2$H$_5$)CH$_2$CH$_2$—.

The repeating unit of —[R$_f$-Q-O—C(O)—C(CH$_3$)═CH$_2$]$_x$— or of —[R$_f$-Q-O—C(O)—CH═CH$_2$]$_x$—, or a mixture thereof, is present at from about 10% to about 95% by weight of the copolymer, preferably at from about 30% to about 95% by weight, more preferably at from about 40% to about 80% by weight. The repeating unit of —[CH—CH$_2$—C(O)—NH—C(CH$_3$)$_2$CH$_2$SO$_3$M]$_t$- is present in the copolymer at from about 10% to about 70% by weight, preferably from about 15% to about 60% by weight. The repeating unit of —[CH$_2$(O)CH—CH$_2$—O—C(O)—C(CH$_3$)—CH$_2$]$_y$— is present at 0% to about 10% by weight, preferably at from about 0.5% to about 5% by weight.

The Formula 1 copolymer is prepared by polymerization of a fluorinated (meth)acrylic monomer with other monomers including glycidyl methacrylate and 2-acrylamido-2-methyl-1-propanesulfonic acid and/or metal salts thereof. The fluorinated (meth)acrylate copolymers of Formula 1 are prepared in organic solvent or emulsified in water by free radical initiated polymerization of a mixture of fluorinated (meth) acrylic monomer with any of other monomers described above. The fluorinated copolymers of this invention are made by agitating the monomers described above in organic solvent or water in a suitable reaction vessel which is equipped with an agitation device and an external heating and cooling device. A free radical initiator is added and the temperature is raised to from about 20° to about 80° C. The polymerization initiator is exemplified by 2,2'-azobis(2-amidinopropane dihydrochloride or 2,2'-azobis(isobutyramidine)dihydrochloride. This type of initiator is sold by E. I. du Pont de Nemours and Company, Wilmington, Del., commercially under the name of "VAZO". An example of a suitable polymerization regulator or chain transfer agent is dodecylmercaptan. Suitable organic solvents useful in the preparation of the copolymers of Formula 1 of the present invention include tetrahydrofuran, acetone, methyl isobutyl ketone, isopropanol, ethyl acetate, and mixtures thereof. Isopropanol is preferred. The reaction is conducted under an inert gas, such as nitrogen, to the exclusion of oxygen. The polymer is optionally isolated by precipitation, and optionally purified by conventional means such as recrystallization. The solvent is removed by evaporation, or the solution is retained for dilution and application to the substrate. The product of the reaction is a fluorinated (meth)acrylate copolymer of Formula 1.

The resulting fluorinated (meth)acrylate copolymer of Formula 1 then is applied to a substrate as is, or is diluted with or emulsified in water and applied to a substrate. Alternatively the copolymer is further dispersed or dissolved in a solvent of a simple alcohol or ketone that is suitable as the solvent for final application to substrates (hereinafter the "application solvent"). Alternatively, an aqueous dispersion is prepared by removing solvents from the polymerization product by evaporation and the use of emulsification or homogenization procedures known to those skilled in the art. Such solvent-free emulsions are preferred to minimize flammability and volatile organic compounds (VOC). The final product for application to a substrate is a dispersion (if water based, or emulsified in water) or a solution (if a solvent other than water is used) of the fluorinated (meth)acrylate copolymer of Formula 1.

Examples of suitable fluorinated (meth)acrylic monomers of formula [R$_f$Q-O—C(O)—C(CH$_3$)═CH$_2$]$_x$, or [R$_f$-Q-O—C(O)—CH═CH$_2$]$_x$ used in the preparation of the copolymers of Formula 1 of the present invention include the following:

$C_6F_{13}CH_2CH_2O$—COC(CH$_3$)═CH$_2$,
$C_6F_{13}CH_2CH_2O$—COCH═CH$_2$,
$C_6F_{13}CH_2CH(OH)CH_2O$—COC(CH$_3$)═CH$_2$,
$C_6F_{13}CH_2CH(OH)CH_2O$—COCH═CH$_2$,
$C_4F_9CH_2CH_2O$—CONHCH$_2$CH$_2$O—COC(CH$_3$)═CH$_2$,
$C_4F_9CH_2CH_2O$—CONHCH$_2$CH$_2$O—COCH═CH$_2$,
$C_4F_9CH_2CF_2$—CH$_2$CH$_2$O—COC(CH$_3$)═CH$_2$,
$C_4F_9CH_2CF_2$—CH$_2$CH$_2$O—COCH═CH$_2$,
$C_4F_9CH_2CF_2$—CH$_2$CH(OH)CH$_2$O—COC(CH$_3$)═CH$_2$,
$C_4F_9CH_2CF_2$—CH$_2$CH(OH)CH$_2$O—COCH═CH$_2$,
$C_3F_7OCF(CF_3)$—CONHCH$_2$CH$_2$O—COCH═CH$_2$,
$(C_3F_7OCF(CF_3)$—CONHCH$_2$)$_2$CHO—COCH═CH$_2$,
$C_3F_7OCF_2CF_2$—CH$_2$CH$_2$O—COC(CH$_3$)═CH$_2$,
$C_3F_7OCF_2CF_2$—CH$_2$CH$_2$O—COCH═CH$_2$,
$C_3F_7OCF_2CF_2$—CH$_2$CH(OH)CH$_2$O—COC(CH$_3$)═CH$_2$,
$C_3F_7OCF_2CF_2$—CH$_2$CH(OH)CH$_2$O—COCH═CH$_2$,
$C_6F_{13}SO_2N(CH_3)CH_2CH_2O$—COC(CH$_3$)═CH$_2$,
$C_6F_{13}SO_2N(C_2H_5)CH_2CH_2O$—COC(CH$_3$)═CH$_2$,
$C_6F_{13}SO_2N(C_2H_5)CH_2CH_2O$—COCH═CH$_2$,
$C_6F_{13}CH_2CH_2SO_2N(CH_3)CH_2CH_2O$—COCH═CH$_2$,
$C_6F_{13}CH_2CH_2SO_2N(CH_3)CH_2CH_2O$—COC(CH$_3$)═CH$_2$,
$C_6F_{13}SO_2N(CH_3)CH_2CH_2O$—COCH═CH$_2$,
$C_4F_9SO_2N(CH_3)CH_2CH_2O$—COC(CH$_3$)═CH$_2$,
$C_4F_9SO_2N(CH_3)CH_2CH_2O$—COCH═CH$_2$,
$C_4F_9SO_2N(C_2H_5)CH_2CH_2O$—COC(CH$_3$)═CH$_2$,
$C_4F_9SO_2N(C_2H_5)CH_2CH_2O$—COCH═CH$_2$,
$C_4F_9CH_2CH_2SO_2N(CH_3)CH_2CH_2O$—COC(CH$_3$)═CH$_2$,
$C_4F_9CH_2CH_2SO_2N(CH_3)CH_2CH_2O$—COCH═CH$_2$,
$C_4F_9CH_2CF_2$—SO$_2$N(CH$_3$)CH$_2$CH$_2$O—COC(CH$_3$)═CH$_2$,
$C_4F_9CH_2CF_2$—SO$_2$N(CH$_3$)CH$_2$CH$_2$O—COCH═CH$_2$,
$C_4F_9CH_2CH_2SO_2N(C_2H_5)CH_2CH_2O$—COC(CH$_3$)═CH$_2$, $C_4F_9CH_2CH_2SO_2N(C_2H_5)CH_2CH_2O-COCH=CH_2$,
$C_4F_9CH_2CF_2SO_2N(C_2H_5)CH_2CH_2O-COC(CH_3)=CH_2$,
$C_4F_9CH_2CF_2SO_2N(C_2H_5)CH_2CH_2O-COCH=CH_2$,
$C_3F_7OCF(CF_3)-SO_2N(CH_3)CH_2CH_2O-COCH=CH_2$,
$(C_3F_7OCF(CF_3))-SO_2N(CH_3)CH_2CH_2O-COCH=CH_2$,
$C_3F_7OCF_2CF_2-SO_2N(CH_3)CH_2CH_2O-COC(CH_3)=CH_2$,
$C_3F_7OCF_2CF_2-SO_2N(CH_3)CH_2CH_2O-COCH=CH_2$,
$C_3F_7OCF_2CF_2CH_2CH_2SO_2N(CH_3)CH_2CH_2O-COC(CH_3)=CH_2$, and
$C_3F_7OCF_2CF_2CH_2CH_2SO_2N(CH_3)CH_2CH_2O-COCH=CH_2$.

Many of these fluorinated (meth)acrylic monomers suitable for the preparation of the copolymers of Formula 1 of the present invention are available from E.I. du Pont de Nemours and Company, Wilmington, Del. Fluorinated monomers wherein Q contains a hydroxy group, such as $CH_2CH(OH)CH_2$ are available from Aurora Fine Chemicals, Graz, A-8020, Austria, or from Fluorochem USA, West Columbia, S.C.

Fluorinated urethane (meth)acrylate monomers wherein Q is $-(C_nH_{2n})OCONR^1(C_nH_{2n})-$ are prepared by reacting perfluoroalkylethanol with a (meth)acrylate having a reactive isocyanate group and a polymerizable vinyl double bond. The preferred conditions for the reaction are at a temperature of from about -10° C. to about 60° C. Suitable optional solvents include tetrahydrofuran, methyl isobutyl ketone, acetone, hexane or ethyl acetate.

Vinylidene fluoride-containing monomers and polymers, wherein Q is $(CH_2CF_2)m(CH2)n$, are prepared from the corresponding fluorinated alcohols and fluorinated thiols by esterification with acrylic acid, methacrylic acid, 2-chloroacrylic acid or 2-fluoroacrylic acid using procedures as described in U.S. Pat. No. 3,282,905 and European Patent 1632542 A1. Alternatively, acrylate and methacrylate esters can be made from the corresponding nitrate esters according to the procedures disclosed in U.S. Pat. No. 3,890,376.

Fluorinated alcohols useful in forming the fluorinated acrylates include the fluorinated telomer alcohols of formula (V):

$$R_f-(CH_2CF_2)_q(CH_2CH_2)_r-OH \qquad (V)$$

wherein $R_f$ is a linear or branched perfluoroalkyl group having 2 to 8 carbon atoms. These telomer alcohols are available by synthesis according to Scheme 1.

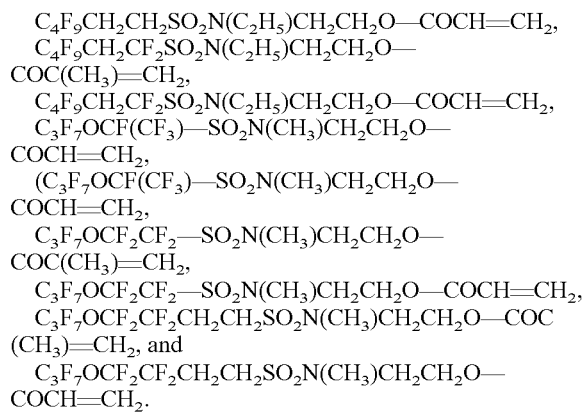

Scheme 1

The telomerization of vinylidene fluoride with linear or branched perfluoroalkyl iodides produces compounds of the structure $R_f(CF12CF_2)_qI$, wherein, q is 1 or more and $R_f$ is a $C_2$ to $C_6$ perfluoroalkyl group. For example, see Balague, et al, "Synthesis of fluorinated telomers, Part 1, Telomerization of vinylidene fluoride with perfluoroalkyl iodides", J. Fluorine Chem. (1995), 70(2), 215-23. The specific telomer iodides are isolated by fractional distillation. The telomer iodides are treated with ethylene by procedures described in U.S. Pat. No. 3,979,469 to provide the telomer ethylene iodides (VI) wherein r is 1 to 3 or more. The telomer ethylene iodides (VI) are treated with oleum and hydrolyzed to provide the corresponding telomer alcohols (V). Alternatively, the telomer ethylene iodides (VI) can be treated with N-methyl formamide followed by ethyl alcohol/acid hydrolysis.

The corresponding thiols of alcohols (V) are available from the telomer ethylene iodides (VI) by treatment with a variety of reagents according to procedures described in J. Fluorine Chemistry, 104, 2 173-183 (2000). One example is the reaction of the telomer ethylene iodides with sodium thioacetate, followed by hydrolysis, as shown in the following scheme:

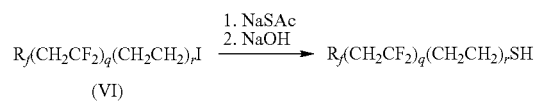

Monomers containing a perfluoroalkylether group are prepared from the corresponding fluorinated alcohols, fluorothiols, or fluoroamines containing a perfluoroalkyl either group.

The fluoroalcohols used to make the compositions of the present invention are available by the following series of reactions:

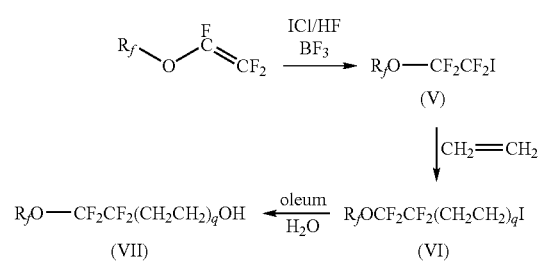

The starting perfluoroalkyl ether iodides are made by the procedure described in U.S. Pat. No. 5,481,028, in Example 8, which discloses the preparation of compounds of formula (V) from perfluoro-n-propyl vinyl ether.

In the second reaction above, a perfluoalkyl ether iodide (V) is reacted with an excess of ethylene at an elevated temperature and pressure. While the addition of ethylene can be carried out thermally, the use of a suitable catalyst is preferred. Preferably the catalyst is a peroxide catalyst such as benzoyl peroxide, isobutyryl peroxide, propionyl peroxide, or acetyl peroxide. More preferably the peroxide catalyst is benzoyl peroxide. The temperature of the reaction is not limited, but a temperature in the range of 110° C. to 130° C. is preferred. The reaction time varies with the catalyst and reaction conditions, but 24 hours is typically adequate. The product can be purified by any means that separates unreacted starting material from the final product, but distillation is preferred. Satisfactory yields up to 80% of theory have been obtained using about 2.7 mols of ethylene per mole of perfluoalkyl ether iodide, a temperature of 110° C. and autogenous pressure, a reaction time of 24 hours, and purifying the product by distillation.

The perfluoroalkylether ethylene iodides (VI) are treated with oleum and hydrolyzed to provide the corresponding alcohols (VII). Alternatively, the perfluoroalkylether ethyl iodides are treated with N-methyl formamide followed by ethyl alcohol/acid hydrolysis. A temperature of about 130° to 160° C. is preferred. The higher homologs (q=2, 3) of telomer ethylene iodides (VI) are available with excess ethylene at high pressure.

The telomer ethylene iodides (VI) can be treated with a variety of reagents to provide the corresponding thiols according to procedures described in J. Fluorine Chemistry, 104, 2 173-183 (2000). One example is the reaction of the telomer ethylene iodides (VI) with sodium thioacetate, followed by hydrolysis.

The telomer ethylene iodides (VI) are treated with omega-mercapto-1-alkanols according the following scheme to provide compounds of formula (VIII):

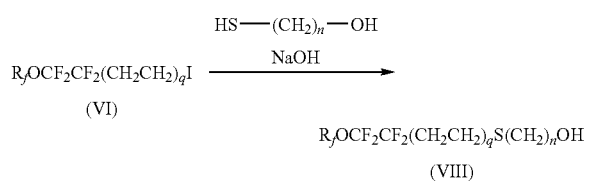

The telomer ethylene iodides (VI) are treated with omega-mercapto-1-alkylamines according the following scheme to provide compounds of formula (IX):

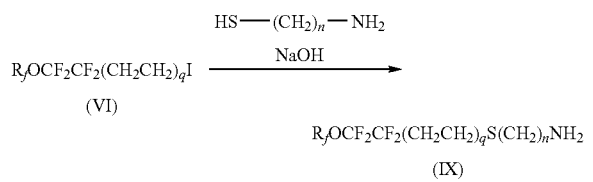

Monomers wherein Q is $-CONR^1(C_nH_{2n})-$ or $(-CONR^1CH_2)_2CH-$, such as the compounds $C_3F_7OCF(CF_3)-CONHCH_2CH_2O-COCH=CH_2$, or $(C_3F_7OCF(CF_3)-CONHCH_2)_2CHO-COCH=CH_2$ are prepared by reacting a fluoroalkyl carboxylic acid derivative such as hexafluoropropylene oxide dimer, or hexafluoroisobutylene with a mono- or primary amine or a primary diamine. The fluoroalkylation of an amine with hexafluoroisobutylene is by contacting the amine with the hexafluoroisobutylene at a reaction temperature and reaction period sufficient to provide a secondary fluoroalkylamine having a hexafluoroisobutyl radical covalently bonded to the amine. The contacting can take place in the presence of a solvent and/or in the presence of a base catalyst. Suitable solvents include alcohols, alkyl ethers, alkyl esters, hydrocarbons, halogenated hydrocarbons, nitriles and amides. Suitable catalysts include tertiary alkyl amines, alkali metal hydroxides, and alkali metal hydrides.

Monomers wherein Q is $SO_2N(R^1)(C_nH_{2n})-$, or $-(C_nH_{2n})SO_2N(R^1)(C_nH_{2n})-$ are prepared by reacting a fluoro sulfonyl fluoride with an amine. In particular, the fluorosulfonyl fluoride is reacted with a methylamine or ethyl amine, such as $NH(CH_3)CH_2CH_2OC(O)CH=CH_2$, $NH(CH_3)CH_2CH_2OC(O)C(CH_3)=CH_2$, $NH(CH_2CH_3)CH_2CH_2OC(O)CH=CH_2$ or $NH(CH_2CH_3)CH_2CH_2OC(O)C(CH_3)=CH_2$.

The present invention comprises a method of providing one or more of oil repellency, water repellency, soil resistance, soil release, stain resistance and stain release to a substrate comprising contacting the fluorinated (meth)acrylate copolymer solution or dispersion of Formula I as described above with the substrate. Suitable substrates include fibrous substrates as defined below.

The fluorinated (meth)acrylate copolymer solution or dispersion is contacted with the substrate by any suitable method. Such methods include, but are not limited to, application by exhaustion, foam, flex-nip, nip, pad, kiss-roll, beck, skein, winch, liquid injection, overflow flood, roll, brush, roller, spray, dipping, immersion, and the like. The copolymer is also contacted by use of a beck dyeing procedure, continuous dyeing procedure or thread-line application.

The fluorinated (meth)acrylate copolymer solution or dispersion is applied to the substrate as such, or in combination with other optional textile finishes or surface treating agents. Such optional additional components include treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, cleanability and similar effects. One or more of such treating agents or finishes are applied to the substrate before, after, or simultaneously with the copolymer of Formula 1. For example for fibrous substrates, when synthetic or cotton fabrics are treated, use of a wetting agent can be desirable, such as ALKANOL 6112 available from E. I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Other additives commonly used with such treating agents or finishes are also optionally present such as surfactants, pH adjusters, cross linkers, wetting agents, wax extenders, and other additives known by those skilled in the art. Suitable surfactants include anionic, cationic, nonionic, N-oxides and amphoteric surfactants. Preferred is an anionic surfactant such as sodium lauryl sulfate, available as DUPONOL WAQE or SUPRALATE WAQE from Witco Corporation, Greenwich, Conn., or SUPRALATE WAQE available from Witco, Houston Tex. Examples of such additives include processing aids, foaming agents, lubricants, anti-stains, and the like. The composition is applied at a manufacturing facility, retailer location, or prior to installation and use, or at a consumer location.

Optionally a blocked isocyanate to further promote durability is added with the copolymer of Formula 1 (i.e., as a blended composition). An example of a suitable blocked isocyanate to use in the present invention is HYDROPHOBOL XAN available from Ciba Specialty Chemicals, High Point, N.J. Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the substrate. When added as a blended isocyanate, amounts up to about 20% by weight are added.

Optionally, nonfluorinated extender compositions are also included in the application composition to potentially further increase fluorine efficiency. Examples of such optional additional extender polymer compositions include hydrocarbon copolymers of acrylates, methacrylates, or mixtures thereof. Such copolymers can also include vinylidene chloride, vinyl chloride, vinyl acetate, or mixtures thereof.

The optimal treatment for a given substrate depends on (1) the characteristics of the fluorinated copolymer, (2) the characteristics of the surface of the substrate, (3) the amount of fluorinated copolymer applied to the surface, (4) the method of application of the fluorinated copolymer onto the surface, and many other factors. Some fluorinated copolymer repellents work well on many different substrates and are repellent to oil, water, and a wide range of other liquids. Other fluorinated copolymer repellents exhibit superior repellency on some substrates or require higher loading levels.

The present invention further comprises substrates treated with the fluorinated (meth)acrylate copolymer solution or dispersion of Formula 1 as described above. Suitable substrates include fibrous substrates. The fibrous substrates include fibers, yarns, fabrics, fabric blends, textiles, nonwovens, paper, leather, and carpets. These are made from natural or synthetic fibers including cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof. By "fabric blends" is meant fabric made of two or more types of fibers. Typically these blends are a combination of at least one natural fiber and at least one synthetic fiber, but also can include a blend of two or more natural fibers or of two or more synthetic fibers. Carpet substrates can be dyed, pigmented, printed, or undyed. Carpet substrates can be scoured or unscoured. Substrates to which it is particularly advantageous to be treated with the method of the present invention so as to impart soil resistant and soil release properties include those prepared from polyamide fibers (such as nylon), cotton and blends of polyester and cotton, particularly such substrates being used in tablecloths, garments, washable uniforms and the like. The nonwoven substrates include, for example, spunlaced nonwovens, such as SONTARA available from E. I. du Pont de Nemours and Company, Wilmington, Del., and spunbonded-meltblown-spunbonded nonwovens. The treated substrates of the present invention have one or more of excellent water repellency, oil repellency, soil resistance, soil release, stain resistance and stain release.

The method of the present invention is useful to provide excellent water repellency, oil repellency, soil resistance, soil release, stain resistance and stain release to treated substrates. The surface properties are obtained using a copolymer containing a perfluoroalkyl group of from about 2 to about 8 carbons, preferably from about 2 to about 6 carbons. The treated substrates of the present invention are useful in a variety of applications and products such as clothing, protective garments, carpet, upholstery, furnishings, and other uses. The excellent surface properties described above help to maintain surface cleanliness and therefore can permit longer use.

Test Methods

Test Method 1—Wicking and Stain Release Test for Fabric

A. Fabric Treatment

The fabrics used were 100% cotton, available from Textile Innovators Corporation, 100 Forest Street, Windsor, N.C. 27983. The fabrics were different colors, weights, and constructions. The prepared concentrated polymer emulsions of the invention were diluted with deionized water to achieve a bath having 3% by weight of the final copolymer emulsion to be tested in the bath to achieve a approximately 1000 ppm fluorine by weight on the fabric after padding and drying.

The treatment bath was applied to the fabric in a pad application, in which the fabric was passed through a trough containing water and treatment compounds for approximately two seconds, and passed between two rolls with an applied pressure of approximately 20 psi ($137.9 \times 10^3$ Pa) to achieve a wet pick up of between 100% by weight and 300% by weight. The fabric was dried to a temperature approximately 160° C., and held at that temperature for 3 minutes.

B. Wicking Test

For the wicking testing, 5 drops of DI water were placed on the cotton samples on different areas of the material. The time (in seconds) it took to completely absorb into the fabric was measured. If the drop had not been absorbed within 180 seconds, a value of 180+ was recorded. The wicking time is an indication of hydrophilicity or hydrophobicity. A faster wicking time indicates higher hydrophilicity, and a slower wicking time indicates higher hydrophobicity.

C. Stain Release Test:

The stain release test was taken from the AATCC Test Method 130-1995. Five drops of either mineral oil or corn oil were placed in the center of each treated sample on a piece of blotter paper. A piece of glassine paper (weighing paper) was placed over the spot and a five-pound weight was placed on top of the paper. After 60 seconds, the weight and glassine paper were removed. Four red dots were marked around the oil spot. The samples were placed in a Kenmore washing machine with the following settings of Large load, Warm (100° F., 38° C.)/Cold, One rinse, Ultra Clean (setting 12), and Normal (fast/slow). 100 of AATCC WOB detergent and 4 lbs. of material including ballasts were added to the wash machine. After washing, the samples were placed in the Kenmore dryer on the high setting for 45 minutes. The samples were rated based on the Stain Release Replica Grades below.

Stain Release Grades:

| | |
|---|---|
| Grade 5 | Stain equivalent to Standard Stain 5 |
| Grade 4 | Stain equivalent to Standard Stain 4 |
| Grade 3 | Stain equivalent to Standard Stain 3 |
| Grade 2 | Stain equivalent to Standard Stain 2 |
| Grade 1 | Stain equivalent to Standard Stain 1 |

Grade 5 represented the best stain removal and grade 1 the poorest stain removal.

Test Method 2—Water Repellency Test

The water repellency of a treated substrate was measured according to AATCC standard Test Method No. 193-2004 and the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the substrate and the extent of surface wetting is determined visually.

The composition of water repellency test liquids is shown in table 1.

TABLE 1

| Water Repellency Rating Number | Composition, Volume % Isopropyl Alcohol | Composition, Volume % Distilled Water |
|---|---|---|
| 1 | 2 | 98 |
| 2 | 5 | 95 |
| 3 | 10 | 90 |
| 4 | 20 | 80 |

TABLE 1-continued

| Water Repellency Rating Number | Composition, Volume % Isopropyl Alcohol | Composition, Volume % Distilled Water |
|---|---|---|
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Three drops of Test Liquid 1 are placed on the treated substrate. After 10 seconds, the drops are removed by using vacuum aspiration. If no liquid penetration or partial absorption (appearance of a darker wet patch on the substrate) is observed, the test is repeated with Test Liquid 2. The test is repeated with Test Liquid 3 and progressively higher Test Liquid numbers until liquid penetration (appearance of a darker wet patch on the substrate) is observed. The test result is the highest Test Liquid number that does not penetrate into the substrate. Higher scores indicate greater repellency.

Test Method 3—Oil Repellency Test

The treated samples were tested for oil repellency by a modification of AATCC standard Test Method No. 118, conducted as follows. A sample treated with an aqueous dispersion of polymer as previously described in Test Method 1, is maintained for a minimum of 2 hours at 23° C.+20% relative humidity and 65° C.+10% relative humidity. A series of organic liquids, identified below in Table 2, are then applied dropwise to the samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating is the highest numbered test liquid for which two of the three drops remained spherical to hemispherical, with no wicking for 30 seconds. In general, treated samples with a rating of 5 or more are considered good to excellent. For fabrics such as leather having a rating of one or greater can be used in certain applications.

TABLE 2

Oil Repellency Test Liquids

| Oil Repellency Rating Number | Test Solution |
|---|---|
| 1 | NUJOL Purified Mineral Oil |
| 2 | 65/35 Nujol/n-hexadecane by volume at 21° C. |
| 3 | n-hexadecane |
| 4 | n-tetradecane |
| 5 | n-dodecane |
| 6 | n-decane |
| 7 | n-octane |
| 8 | n-heptane |

Note:
NUJOL is a trademark of Plough, Inc., for a mineral oil having a Saybolt viscosity of 360/390 at 38° C. and a specific gravity of 0.880/0.900 at 15° C.

Test Method 4—Accelerated Soiling Test

A drum mill (on rollers) was used to tumble synthetic soil onto carpet samples. Synthetic soil was prepared as described in AATCC Test Method 123-2000, Section 8. Soil-coated beads were prepared as follows. Synthetic soil, 3 g, and 1 liter of clean nylon resin beads (SURLYN ionomer resin beads 1/8-3/16 inch (0.32-0.48 cm) diameter were placed into a clean, empty canister. SURLYN is an ethylene/methacrylic acid copolymer, available from E. I. du Pont de Nemours and Co., Wilmington Del.). The canister lid was closed and sealed with duct tape and the canister rotated on rollers for 5 minutes. The soil-coated beads were removed from the canister.

Carpet samples to insert into the drum were prepared as follows. The carpet material used was a commercial level loop (LL) 1245 denier, 1/10 gauge (0.1 inch or 2.5 mm tuft separation), 26 oz/yd$^2$ (0.88 kg/m$^2$), dyed pale yellow and available from Invista Inc., Wilmington Del. Total carpet sample size was 8×25 inches (20.3×63.5 cm) for these tests. One test sample and one control sample were tested at the same time. The carpet pile of all samples was laid in the same direction. The shorter side of each carpet sample was cut in the machine direction (with the tuft rows). Strong adhesive tape was placed on the backside of the carpet pieces to hold them together. The carpet samples were placed in the clean, empty drum mill with the tufts facing toward the center of the drum. The carpet was held in place in the drum mill with rigid wires. Soil-coated resin beads, 250 cc, and 250 cc of ball bearings (5/16 inch, 0.79 cm diameter) were placed into the drum mill. The drum mill lid was closed and sealed with duct tape. The drum was run on the rollers for 2½ minutes at 105 rpm. The rollers were stopped and the direction of the drum mill reversed. The drum was run on the rollers for an additional 2½ minutes at 105 rpm. The carpet samples were removed and vacuumed uniformly to remove excess dirt. The soil-coated beads were discarded.

The Delta E color difference for the soiled carpet was measured for the test and control items versus the original unsoiled carpet. Color measurement of each carpet was conducted on the carpet following the accelerated soiling test. For each control and test sample the color of the carpet was measured, the sample was soiled, and the color of the soiled carpet was measured. The Delta E is the difference between the color of the soiled and unsoiled samples, expressed as a positive number. The color difference was measured on each item, using a Minolta Chroma Meter CR-310. Color readings were taken at five different areas on the carpet sample, and the average Delta E was recorded. The control carpet for each test item was of the same color and construction as the test item. The control carpet had not been treated with any fluorochemical.

The surface effects on carpet including soil resistance and/or soil release are measured by the percentage of soil blocked. The percentage of soil blocked after drum soil as "% Cleaner than untreated" was calculated by following calculations:

$$\% \text{ Cleaner than untreated} = \frac{\left[\begin{array}{l}(\text{Delta } E \text{ of soiled untreated carpet}) - \\ (\text{Delta } E \text{ of soiled treated carpet})\end{array}\right]}{(\text{Delta } E \text{ of soiled untreated carpet})} \times 100\%$$

Use of this value corrects for different carpet color and construction, and permits meaningful comparisons between data sets. A higher percentage indicates superior soil resistance.

Materials

The following materials were used in the Examples unless specified otherwise. The abbreviations indicated below were used in the Tables.
1) Monomer A: 1H,1H,2H,2H-perfluorooctylacrylate ester, available from E. I. du Pont de Nemours and Company, Wilmington, Del.
2) Monomer B: 1H,1H,2H,2H-perfluorooctylmethacrylate ester, available from E. I. du Pont de Nemours and Company, Wilmington, Del.
3) AMPS: 2-acrylamido-2-methyl-1-propanesulfonic acid, available from Sigma-Aldrich, Milwaukee, Wis.
4) GMA: glycidyl (meth)acrylate, available from Sigma-Aldrich, Milwaukee, Wis.
5) BRIJ 58: polyethylene glycol hexadecyl ether having an average number molecular weight of 1124 available from Sigma-Aldrich.

EXAMPLES

Example 1

In Example 1, a copolymer was prepared as described below. In a four-neck 500 mL round bottom flask fitted with a condenser, mechanical stirrer, gas inlet, and gas outlet was added 1H,1H,2H,2H-perfluorooctylmethacrylate ester (7.0 grams, 0.016 moles), 1H,1H,2H,2H-perfluorooctylacrylate ester (3.0 grams, 0.0072 moles), 2-acrylamido-2-methyl-1-propanesulfonic acid (AMPS, 2.5 grams, 0.012 moles), glycidyl (meth)acrylate (GMA, 0.2 grams, 0.0014 moles), dodecyl mercaptan (0.04 grams), VAZO 67 (1.32 grams), and 2-propanol (200 grams). While stirring at 150 rpm at 20° C. for one hour, dry nitrogen was gently bubbled through the solution to remove any oxygen. The nitrogen bubbling was replaced with a blanket of nitrogen and the reaction mixture was heated to 80° C. with stirring for 16 hours. The nitrogen blanket was removed and the polymer solution was allowed to cool to 20° C. Approximately 150 grams of the 2-propanol was removed by reduced temperature distillation. A solution of sodium bicarbonate (0.5 grams) in 100 mL of water was added to the reaction mixture. The remaining 2-propanol was removed by reduced temperature distillation, resulting in an aqueous dispersion of fluorinated AMPS copolymer with a pH of approximately 8. The copolymer solution prepared above from Example 1 was applied using Test Method 1 to 100% cotton fabrics. The treated fabrics were tested for wicking, and hydrophilic stain release using Test Method 1. The results are listed below in Table 4.

Examples 2-18

In Examples 2-18, the copolymer compounds listed in Table 3 were prepared using the procedure described above in Example 1.

TABLE 3

| Copolymer | Monomer A (% weight) | Monomer B (% weight) | GMA* (% weight) | AMPS* (% weight) |
|---|---|---|---|---|
| Example 1 | 23.6% | 55.1% | 1.6% | 19.7% |
| Example 2 | 7.9% | 70.9% | 1.5% | 19.7% |
| Example 3 | 6.8% | 61.3% | 2.7% | 29.2% |
| Example 4 | 7.7% | 69.8% | 3.1% | 19.4% |
| Example 5 | 20.4% | 47.7% | 2.7% | 29.2% |
| Example 6 | 20.7% | 48.3% | 1.4% | 29.6% |
| Example 7 | 0% | 75.8% | 1.5% | 22.7% |
| Example 8 | 0% | 78.7% | 1.6% | 19.7% |
| Example 9 | 0% | 73.0% | 1.5% | 25.5% |
| Example 10 | 23.5% | 54.9% | 1.6% | 19.6% |
| Example 11 | 15.7% | 62.7% | 1.6% | 19.6% |
| Example 12 | 11.0% | 62.3% | 1.6% | 24.9% |
| Example 13 | 20.7% | 48.3% | 1.4% | 29.6% |
| Example 14 | 18.5% | 43.2% | 1.2% | 37.0% |
| Example 15 | 14.9% | 34.6% | 0.1% | 49.5% |
| Example 16 | 5.0% | 44.6% | 1.6% | 49.5% |
| Example 17 | 14.9% | 34.6% | 0.0% | 49.5% |
| Example 18 | 12.9% | 30.2% | 0.9% | 56.0% |

*GMA is glycidyl(meth)acrylate
*AMPS is 2-acryloamido-2methyl-1-propanesulfonic acid The copolymer solutions prepared above from Examples 2-18 were applied using Test Method 1 to 100% cotton fabrics. The treated fabrics were tested for wicking, and hydrophilic stain release using Test Method 1. The results are listed below in Table 4.

TABLE 4

Wicking, Stain Release Tests

| Applied Compolymer | Wicking (sec) | | Mineral oil | | Corn Oil | |
|---|---|---|---|---|---|---|
| | Initial | After 5HW* | Initial | After 5HW* | Initial | After 5HW* |
| Example 1 | 6 | 2 | 5 | 5 | 5 | 5 |
| Example 2 | 45 | 11 | 5 | 5 | 5 | 5 |
| Example 3 | 60 | 6 | 5 | 5 | 5 | 5 |
| Example 4 | 25 | 8 | 4 | 4 | 4 | 5 |
| Example 5 | 38 | 1 | 4 | 3 | 5 | 3 |
| Example 6 | 45 | 3 | 5 | 4 | 5 | 5 |
| Example 7 | 22 | 6 | 3 | 2 | 5 | 4 |
| Example 8 | 8 | 3 | 4 | 5 | 4 | 4 |
| Example 9 | 13 | 7 | 4.5 | 4 | 5 | 1 |
| Example 10 | 73 | 5 | 4 | 4 | 3 | 5 |
| Example 11 | 15 | 5 | 5 | 5 | 5 | 5 |
| Example 12 | 180 | 7 | 5 | 5 | 5 | 5 |
| Example 13 | 60 | 4 | 5 | 4 | 5 | 5 |
| Example 14 | 6 | 2 | 3 | 2 | 4 | 3 |
| Example 15 | 1 | 0 | 2 | 1 | 4 | 2 |
| Example 16 | 3 | 0 | 2 | 1 | 3 | 1 |
| Example 17 | 2 | 0 | 3 | 2 | 3 | 1 |
| Example 18 | 2 | 0 | 2 | 1 | 3 | 2 |
| Untreated | 8 | 0 | 1 | 1 | 2 | 1 |

*5HW indicates 5 washing laundry processes per Test Method 1.

The data in Table 4 shows that the examples of the present invention provided excellent release of oily soils from cotton fabrics while still allowing water to wick and wet the fabric.

The copolymer solutions prepared from Examples 1-18 above were applied to carpet samples for testing for water repellency, oil repellency, soil resistance and soil release using Test Methods 2, 3 and 4. The results are listed in Table 5.

TABLE 5

Tests on Carpet

| Applied Compound | Water Repellency | Oil Repellency | Delta Delta E (vs. untreated) | % Cleaner than untreated |
|---|---|---|---|---|
| Example 1 | 0 | 5 | 7.7 | 19% |
| Example 2 | 0 | 5 | 8 | 26% |
| Example 3 | 0 | 4 | 9.9 | 24% |
| Example 4 | 0 | 5 | 5.3 | 17% |
| Example 5 | 0 | 5 | 7.9 | 25% |
| Example 6 | 0 | 5 | 6.6 | 21% |
| Example 8 | 0 | 4 | 4.5 | 11% |
| Example 10 | 0 | 5 | 2.6 | 8% |
| Example 11 | 0 | 5 | 0.4 | 1% |
| Example 12 | 0 | 5 | 7.6 | 22% |
| Example 13 | 0 | 5 | 8.8 | 25% |
| Example 14 | 0 | 4 | 7.9 | 23% |
| Example 15 | 0 | 2 | 7.5 | 21% |
| Example 16 | 0 | 2 | 6.3 | 18% |
| Example 17 | 0 | 2 | 4.4 | 13% |
| Example 18 | 0 | 1 | 3.1 | 9% |
| Untreated | 0 | 0 | 0 | 0% |

The data in Table 5 shows that the examples of the present invention provided exceptional oil repellency and dry soil resistance and soil release to treated carpeting.

Examples 19-26

In Examples 19-26 the copolymer compounds listed in Table 6 were prepared using the procedure described above in Example 1.

TABLE 6

Copolymer Compounds

| Copolymer Compound | Monomer (% by weight) | GMA* (% by weight) | AMPS* (% by weight) |
|---|---|---|---|
| Example 19 | F—(CF$_2$CF$_2$CH$_2$CH$_2$)nO—COCH=CH$_2$ (69.0%) | 1.4% | 29.6% |
| Example 20 | (C$_3$F$_7$OCF(CF$_3$)CONHCH$_2$)$_2$CHO—COCH=CH$_2$ (69.0%) | 1.4% | 29.6% |
| Example 21 | C$_3$F$_7$OCF(CF$_3$)CONHCH$_2$CH$_2$O—COCH=CH$_2$ (69.0%) | 1.4% | 29.6% |
| Example 22 | C$_4$F$_9$CH$_2$CF$_2$CH$_2$CH$_2$O—COCH=CH$_2$ (69.0%) | 1.4% | 29.6% |
| Example 23 | C$_4$F$_9$CH$_2$CF$_2$CH$_2$CH$_2$O—COC(CH$_3$)=CH$_2$ (69.0%) | 1.4% | 29.6% |
| Example 24 | C$_3$F$_7$OCF$_2$CF$_2$CH$_2$CH$_2$O—COCH=CH$_2$ (69.0%) | 1.4% | 29.6% |
| Example 25 | C$_3$F$_7$OCF$_2$CF$_2$CH$_2$CH$_2$O—COC(CH$_3$)=CH$_2$ (69.0%) | 1.4% | 29.6% |
| Example 26 | C$_4$F$_9$CH$_2$CH$_2$OCONHCH$_2$CH$_2$O—COC(CH$_3$)=CH$_2$ (69.0%) | 1.4% | 29.6% |

*GMA is glycidyl(meth)acrylate
*AMPS is 2-acryloamido-2methyl-1-propanesulfonic acid The copolymer solutions prepared from Examples 19-26 above were applied using Test Method 1 to 100% cotton fabrics. The treated fabrics were tested for wicking, and hydrophilic stain release using Test Method 1. The results are listed in Table 7.

TABLE 7

Wicking and Stain Release Tests

| | Wicking (sec) | | Mineral oil | | Corn Oil | |
|---|---|---|---|---|---|---|
| Applied Compound | Initial | After 5HW* | Initial | After 5HW* | Initial | After 5HW* |
| Example 19 | 0 | 0 | 4.5 | 3.5 | 4 | 4 |
| Example 20 | 15 | 2 | 4 | 3.5 | 4.5 | 3 |
| Example 21 | 0 | 0 | 4 | 4 | 4 | 4 |
| Example 22 | 25 | 2 | 4 | 4.5 | 5 | 4.5 |
| Example 23 | 0 | 0 | 4.5 | 3.5 | 4 | 3.5 |
| Example 24 | 11 | 2 | 5 | 4.5 | 5 | 4.5 |
| Example 25 | 0 | 0 | 4 | 3 | 4.5 | 4 |
| Example 26 | 13 | 2 | 4 | 4 | 4.5 | 4.5 |
| Untreated | 8 | 0 | 1 | 1 | 2 | 1 |

*5HW indicates 5 washing laundry processes per Test Method 1.

The data in Table 7 shows that the examples in this invention provided excellent release of oily soils from cotton fabrics while still allowing water to wick and wet the fabric.

The copolymer solutions prepared from Examples 19-26 above were applied to carpet samples and tested for water repellency, oil repellency, soil resistance and soil release using Test Methods 2, 3 and 4. The results are listed in Table 8.

TABLE 8

Tests on Carpet

| Applied Compound | Water Repellency | Oil Repellency | Delta Delta E (vs. untreated) | % Cleaner than untreated |
|---|---|---|---|---|
| Example 19 | 0 | 3 | 7.12 | 18% |
| Example 21 | 0 | 3 | 5.14 | 13% |
| Example 22 | 0 | 3 | 7.82 | 20% |
| Example 23 | 0 | 4 | 3.75 | 10% |
| Example 24 | 0 | 5 | 6.51 | 17% |
| Example 25 | 0 | 4 | 2.01 | 5% |
| Example 26 | 0 | 3 | 9.43 | 23% |
| Untreated | 0 | 0 | 0 | 0% |

The data in Table 8 shows that the examples of the present invention provided exceptional oil repellency and dry soil resistance to treated carpeting.

Example 27

In Example 27, the copolymer was prepared using emulsion polymerization. Into a plastic beaker were combined 80 grams of deionized water, 2.0 grams of 20 weight % BRIJ 58 in water, 0.04 gram of dodecyl mercaptan, 0.20 grams of glycidyl (meth)acrylate (GMA), 2.5 grams of 2-acrylamide-2-methyl-1-propanesulfonic acid (AMPS) and 3 weight % sodium tetraborate in water (both from Sigma-Aldrich, Milwaukee, Wis.), 5.0 grams of sulfonate AA-10 from Intertrade Holding, Copperhill, Tenn., 3.0 grams of 1H,1H,2H,2H-perfluorooctylacrylate ester (Monomer A), and 7.0 grams of 1H,1H,2H,2H-perfluorooctylmethacrylate ester (Monomer B). The reaction mixture was heated to 55° C. and emulsified in a sonicator twice for two minutes until a uniform milky white emulsion resulted. The solution was charged to a 250 mL flask equipped a nitrogen blanket, condenser, overhead stirrer and temperature probe, set to nitrogen sparging, and stirred at 170 rpm. Over 30 minutes, the flask was heated to 75° C. and was switched to nitrogen blanket. 2.0 grams of 10 weight % potassium persulfate in water from Sigma-Aldrich, Milwaukee, WI was added and stirring was maintained for 1 hour at 75° C. An additional 1.0 gram of 10 weight % potassium persulfate in water from Sigma-Aldrich, Milwaukee, Wis. was added and stirring was maintained for 3 hours at 75° C. The solution was then cooled to room temperature and then filtered into a small necked bottle using gravity filtration through a milk filter to give an emulsion copolymer with 13.2% solids by weight. The emulsion copolymer of Example 27 was applied to 100% cotton fabric using Test Method 1 and tested for wicking and stain release. The results are listed in Table 10.

Example 28

In Example 28, the copolymer compound was prepared using the same emulsion polymerization procedure described above in Example 27, except using different amounts of monomers in the reaction as described in Table 9:

TABLE 9

Copolymer Compounds

| Copolymer Compound | Monomer A (% weight) | Monomer B (% weight) | GMA (% weight) | AMPS (% weight) |
|---|---|---|---|---|
| Example 27 | 23.6% | 55.1% | 1.6% | 19.7% |
| Example 28 | 20.7% | 48.3% | 1.4% | 29.6% |

The emulsion copolymer of Example 28 was applied using Test Method 1 to 100% cotton fabrics. The treated fabrics were tested for wicking, and hydrophilic stain release using Test Method 1. The results are listed in Table 10.

TABLE 10

Wicking, Stain Release Tests

| | Wicking (sec) | | Mineral oil | | Corn Oil | |
|---|---|---|---|---|---|---|
| Applied Copolymer | Initial | After 5HW* | Initial | After 5HW* | Initial | After 5HW* |
| Example 27 | 180+ | 180+ | 3.5 | 4.5 | 4 | 4 |
| Example 28 | 180+ | 143 | 4 | 4.5 | 4.5 | 3 |
| Untreated | 8 | 0 | 1 | 1 | 2 | 1 |

*5HW indicates 5 washing laundry procedures per test Method 1

The data in Table 10 shows that Examples 27 and 28 of the present invention provided excellent wicking and stain release which was durable through several laundry cycles.

The emulsion copolymers of Examples 27-28 were applied to carpet samples for testing for water repellency, oil repellency, soil resistance and soil release using Test Methods 2, 3 and 4. The results are listed in Table 11.

TABLE 11

Soil Release Tests on Carpet

| Applied Copolymer | Water Repellency | Oil Repellency | Delta Delta E (vs. untreated) | % Cleaner than untreated |
|---|---|---|---|---|
| Example 27 | 4 | 2 | 0.09 | 0% |
| Example 28 | 5 | 3 | 1.22 | 3% |
| Untreated | 0 | 0 | 0 | 0% |

The data in Table 11 shows that Examples 27 and 28 of the present invention provided excellent water repellency, oil repellency, soil resistance and soil release.

What is claimed is:

1. A method of providing water repellency, oil repellency, soil resistance, soil release, stain resistance and stain release to a substrate comprising contacting said substrate with a composition comprising a copolymer having repeating units of Formula 1 in any sequence:

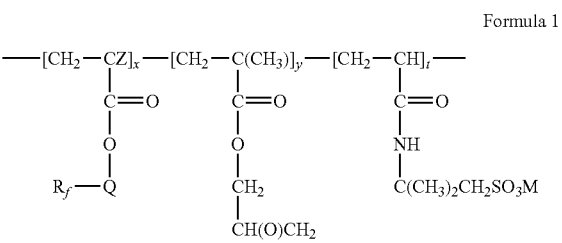

Formula 1 wherein
$R_f$ is a straight or branched perfluoroalkyl group having from about 2 to about 8 carbon atoms, or a mixture thereof, which is optionally interrupted by at least one oxygen atom,
Q is alkylene of 1 to about 15 carbon atoms, hydroxyalkylene of 2 to about 15 carbon atoms, $-O(C_nH_{2n})-$, $-(CH_2CF_2)_m(CH_2)_n-$, $-CONR^1(C_nH_{2n})-$, —$(C_nH_{2n})OCONR^1(C_nH_{2n})$—, $(-CONR^1CH_2)_2CH$—, —$SO_2N(R^1)(C_nH_{2n})$—, or —$(C_nH_{2n})SO_2N(R^1)(C_nH_{2n})$—, each $R^1$ is independently H or alkyl of 1 to about 4 carbon atoms, each n is independently 1 to about 15, each m is independently 1 to about 4, Z is hydrogen or methyl, x is a positive integer, y is zero or a positive integer, t is a positive integer, and M is $H^+$, alkali metal cation, alkaline earth metal cation, or ammonium.

2. The method of claim 1 wherein $R_f$ is independently selected from the group consisting of $C_6F_{13}$—, $C_4F_9$—, $C_3F_7$—, $C_3F_7OCF_2CF_2$—, $C_3F_7OCF(CF_3)$—, and $C_3F_7O$—$(CF(CF_3)CF_2O)_kCFCF_3)$—, wherein k is 1 to 4.

3. The method of claim 1 wherein Q is selected from the group consisting of —$CH_2CH_2$—, $CH_2CH(OH)CH_2$—, —$O(C_nH_{2n})$—, —$(CH_2CF_2)_mCH_2CH_2$—, —$CONHCH_2CH_2$—, —$CH_2CH_2O$—$CONHCH_2CH_2$—, $(-CONHCH_2)_2CH$—, —$SO_2N(CH_3)CH_2CH_2$—, and —$SO_2N(C_2H_5)CH_2CH_2$—.

4. The method of claim 1 wherein the repeating unit of —$[R_f-Q-O-C(O)-C(CH_3)-CH_2]_x$— is present in the copolymer in an amount of about 10% or greater by weight.

5. The method of claim 1 wherein the repeating unit of —$[R_f-Q-O-C(O)-C(CH_3)-CH_2]_x$— is present in the copolymer at from about 30% to about 95% by weight.

6. The method of claim 1 wherein the repeating unit of —$[R_f-Q-O-C(O)-C(CH_3)-CH_2]_x$— is present in the copolymer at from about 40% to about 80% by weight.

7. The method of claim 1 wherein the repeating unit of —$[CH-CH_2-C(O)-NH-C(CH_3)_2CH_2SO3M]_z$- is present in the copolymer at from about 10% to about 70% by weight.

8. The method of claim 1 wherein the repeating unit of —$[CH-CH_2-C(O)-NH-C(CH_3)_2CH_2SO3M]_z$- is present in the copolymer at from about 15% to about 60% by weight.

9. The method of claim 1 wherein repeating unit of —$[CH_2(O)CH-CH_2-O-C(O)-C(CH_3)-CH_2]_y$— is present at 0% to about 10% by weight.

10. The method of claim 1 wherein repeating unit of —$[CH_2(O)CH-CH_2-O-C(O)-C(CH_3)-CH_2]_y$— is present at from about 0.5% to about 5% by weight.

11. The method of claim 1 wherein the composition is contacted with the substrate as an aqueous dispersion or a solution.

12. The method of claim 1 wherein the composition is contacted with the substrate by exhaustion, foam, flex-nip, nip, pad, kiss-roll, beck, skein, winch, liquid injection, overflow flood, roll, brush, roller, spray, dipping or immersion.

13. The method of claim 1 wherein the composition is applied in the presence of at least one agent which provides a surface effect selected from the group consisting of no iron, easy to iron, shrinkage control, wrinkle free, permanent press, moisture control, softness, strength, anti-slip, antistatic, anti-snag, anti-pill, stain repellency, stain release, soil repellency, soil release, water repellency, oil repellency, odor control, antimicrobial, sun protection, and a combination thereof.

14. The method of claim 1 wherein the composition is contacted with the substrate in the presence of at least one of a surfactant, antioxidant, light fastness agent, color fastness agent, water, pH adjuster, cross linker, wetting agent, extender, foaming agent, processing aid, lubricant, blocked isocyanate, nonfluorinated extender, or a combination thereof.

15. A substrate to which has been applied a composition comprising a copolymer having repeating units of Formula 1 in any sequence:

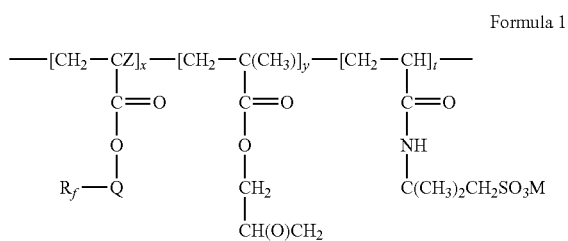

Formula 1 wherein $R_f$ is a straight or branched perfluoroalkyl group having from about 2 to about 8 carbon atoms, or a mixture thereof, which is optionally interrupted by at least one oxygen atom, Q is alkylene of 1 to about 15 carbon atoms, hydroxyalkylene of 2 to about 15 carbon atoms, —$O(C_nH_{2n})$—, —$(CH_2CF_2)_m(CH_2)_n$—, —$CONR^1(C_nH_{2n})$—, —$(C_nH_{2n})OCONR^1(C_nH_{2n})$—, $(-CONR^1CH_2)_2CH$—, —$SO_2N(R^1)(C_nH_{2n})$—, or —$(C_nH_{2n})SO_2N(R^1)(C_nH_{2n})$—, each $R^1$ is independently H or alkyl of 1 to about 4 carbon atoms, each n is independently 1 to about 15, each m is independently 1 to about 4, Z is hydrogen or methyl, x is a positive integer, y is zero or a positive integer, t is a positive integer, and M is $H^+$, alkali metal cation, alkaline earth metal cation, or ammonium, said substrate having water repellency, oil repellency, soil resistance, soil release, stain resistance and stain release.

16. The substrate of claim 15 which is a fibrous substrate.

17. The substrate of claim 15 which is a fiber, yarn, fabric, fabric blend, textile, spunlaced nonwoven, carpet, paper or leather.

18. The substrate of claim 17 which is selected from the group consisting of cotton, cellulose, wool, silk, rayon, nylon, aramid, acetate, acrylic, jute, sisal, sea grass, coir, polyamide, polyester, polyolefin, polyacrylonitrile, polypropylene, polyaramid, and blends thereof.

* * * * *